Oct. 9, 1923. 1,469,830
J. TESSIER
OPERATING HANDLE FOR MOTION PICTURE CAMERAS
Filed Nov. 17, 1922  2 Sheets-Sheet 1
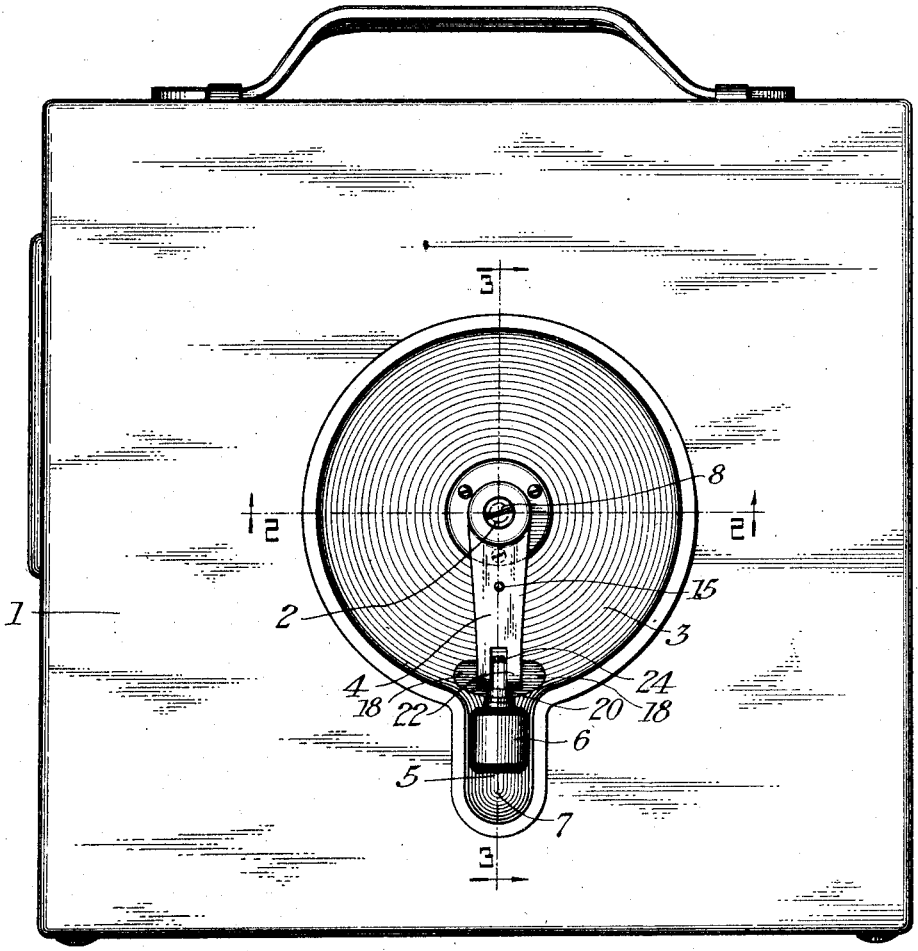
FIG_1_
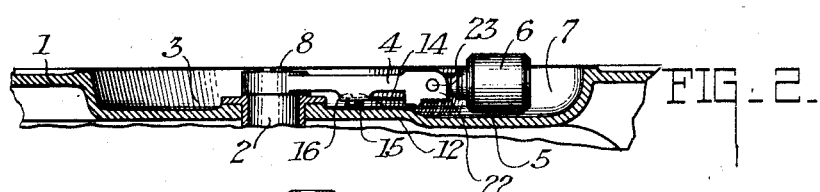
FIG_2_
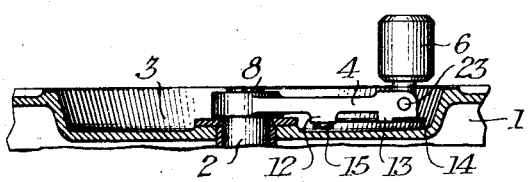
FIG_3_
INVENTOR
*Julien Tessier,*
BY
ATTORNEYS.

Oct. 9, 1923.      1,469,830
J. TESSIER
OPERATING HANDLE FOR MOTION PICTURE CAMERAS
Filed Nov. 17, 1922      2 Sheets-Sheet 2
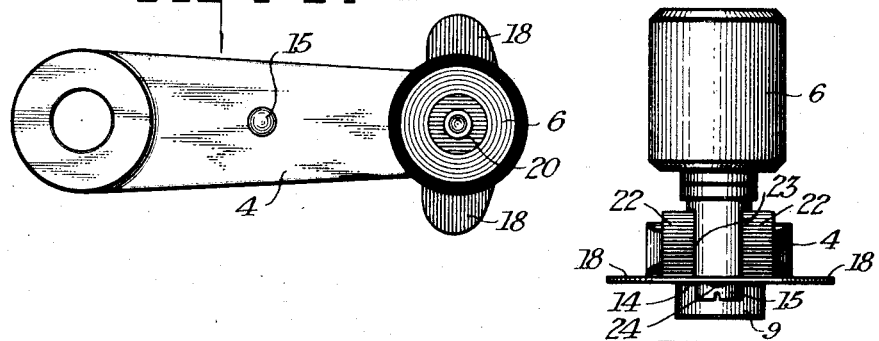
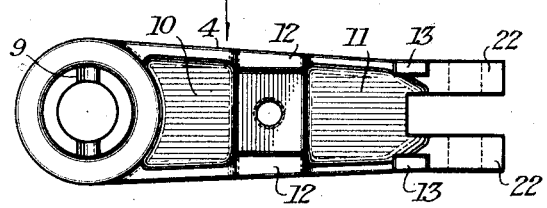
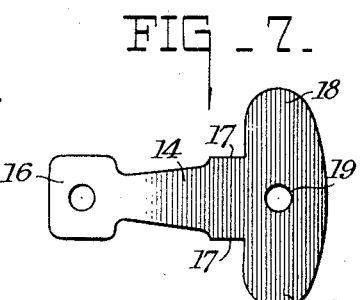
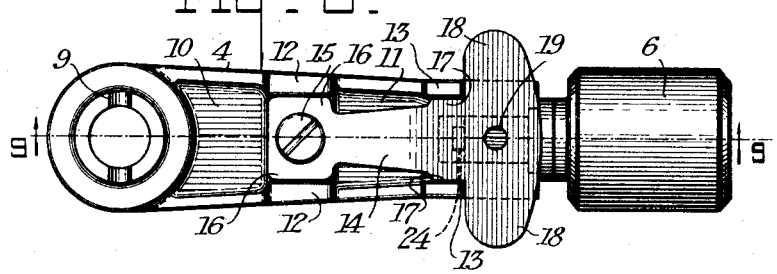
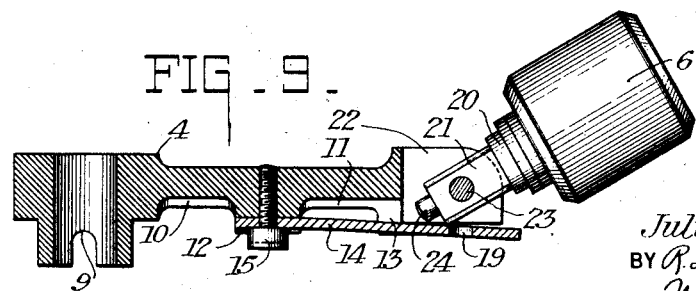
INVENTOR
Julien Tessier,
BY
ATTORNEYS.

Patented Oct. 9, 1923.

1,469,830

UNITED STATES PATENT OFFICE.

JULIEN TESSIER, OF ROCHESTER, NEW YORK, ASSIGNOR TO EASTMAN KODAK COMPANY, OF ROCHESTER, NEW YORK, A CORPORATION OF NEW YORK.

OPERATING HANDLE FOR MOTION-PICTURE CAMERAS.

Application filed November 17, 1922. Serial No. 601,623.

*To all whom it may concern:*

Be it known that I, JULIEN TESSIER, a citizen of the Republic of France, residing at Rochester, in the county of Monroe and State of New York, have invented certain new and useful Improvements in Operating Handles for Motion-Picture Cameras, of which the following is a full, clear, and exact specification.

This invention relates to a folding handle for a motion picture camera, and a camera casing countersunk to adapt it particularly for the handle.

The objects of the invention are to provide such a structure in which there will be no protruding parts to be moved or harmed when the camera is not in use, the handle being readily folded and unfolded, but which when in use will be so firm that there will be no wobbling, or tendency to fold even under the considerable strain necessary during service, and which may be easily released from this firm position when desired, and which when folded will be held against accidental rotation, while at once available for immediate use.

With these and other objects in view my invention resides in certain structures and combinations of parts, all of which will be hereinafter fully described, the novel features being particularly pointed out in the claims at the end of the specification.

In the drawings, in which like reference characters denote like parts throughout:

Fig. 1 is a side elevation of a camera constructed in accordance with and illustrating one form of my invention;

Fig. 2 is a fragmentary section of line 2—2 of Fig. 1;

Fig. 3 is a similar view on line 3—3;

Fig. 4 is a plan view of the crank and handle;

Fig. 5 is an end view thereof;

Fig. 6 is a bottom plan view of the crank;

Fig. 7 is a plan view of a spring;

Fig. 8 is a bottom plan view of the crank and handle assembled; and

Fig. 9 is a section on line 9—9 of Fig. 8, with the handle in a partly folded position.

In the illustrated embodiment of my invention I have made the walls of the camera of castings and side wall 1 through which the operating drive shaft 2 passes is provided with a circular recess 3 which is of sufficient depth to contain the operating crank 4. The recess has a radial extension 5 into which the handle 6 can be folded. While portion 5 is of but little greater width than the handle 6 it is of considerably greater length, thus leaving an opening at 7 which can be used to manipulate the handle.

The operating crank 4 is attached to the main drive shaft 2 by means of a screw 8 which holds the crank in a position in which the slotted end 9 (Fig. 9) engages a pin on the driving shaft. As best shown in Fig. 6, the crank is preferably made from a casting recessed at 10 and 11 for lightness and provided with shoulders 12—12 and 13—13 which are used to position the spring 14. This member is attached to crank 4 by means of a screw 15, shoulders 12—12 positioning the squared end 16 of the spring and shoulders 13—13 preventing any lateral movement of the spring which has portions 17—17 adapted to contact with the guiding shoulders. The spring is equipped with outwardly flaring finger operating portions 18—18 between which there is an aperture 19. Obviously this end of the spring can be moved to and from the crank 4 flexing from the screw 15.

The handle 6 is fastened to a shaft 20, flattened at 21 to pass between the arms 22—22 of crank 4, and it is pivoted at 23 to the crank. A pin 24 on the end of shaft 21 is adapted to snap into aperture 19 thus rigidly holding the handle erect. An upward pull with one finger upon the handle 6 erects it for use, but the spring 14 must be flexed by an operating portion 18 to release pin 24 permitting the handle to fold. When folded the spring 14 tends to hold the handle by contacting with the side of shaft 21, this spring resiliently retaining the handle in its inoperative or folded position.

In use the operation of the handle is as follows: Being in the position shown in Fig. 1 an operator inserts a finger into the recess 7 and draws out on the top of handle 6 thus flexing spring 14 causing pin 24 to snap into aperture 19. The handle is firmly locked in its operative position for cranking the camera. When through cranking, the handle is brought over the recess 5. By pressing down upon one or both operating portions 18—18 spring 14 is flexed releasing pin 24 from aperture 19 and by pressing the handle into recess 5, spring 14 contacts with the side 21 of shaft 20 and is thus retained in a folded position.

When folded the handle projects a very little distance from the side 1, as is shown in Fig. 2, so that the camera can be readily accommodated in a carrying case of relatively small size, and there is no danger of wasting film by accidental turning of the crank.

It is to be noted that the size of the circular recess 3 is such that the crank with its protruding wings 18 just fits therein, the wings which constitute the releasing means being in an open position where they are at once available without having to insert the fingers into a restricted or inconvenient space. At the same time they are extremely unlikely to be accidentally operated to release the handle.

When a motion picture camera is being operated there is frequently considerable stress exerted outwardly or radially on the handle, so that if it were held only by springs or friction in its operative position, it would wobble or turn during use and result in uneven cranking.

It is to be understood that I contemplate as within the scope of my invention all such modifications and equivalents as fall within the scope of the appended claims.

Having thus described my invention, what I claim as new and desire to secure by Letters Patent is:

1. Manual operating means for a motion picture camera comprising a shaft, a crank rigid therewith and a handle pivoted at one end to the crank, said crank having a leaf spring secured thereto and bearing against the pivoted end of the handle, said handle having a flat surface against which the spring is adapted to bear to hold the handle resiliently in one position, and the spring and handle having co-operating latch members, whereby the handle is positively latched in another position.

2. Manual operating means for a motion picture camera comprising a shaft, a crank rigid therewith and a handle pivoted at the end to the crank, said crank having a leaf spring secured thereto and bearing against the pivoted end of the handle, said handle having two surfaces against which the spring is adapted to bear to hold the handle in either of two positions, a lug protruding from one of said surfaces and the spring having an aperture to co-operate with the lug, whereby the handle is positively latched in one of said positions and said spring having an extension whereby it may be manipulated to unlatch the handle.

3. In combination, a wall having a circular recess with a radial extension and having an aperture extending therethrough at the center of said recess, an operating shaft extending through said wall, a crank rigidly attached thereto and lying within the recess, a handle pivoted to the end of the crank and adapted to be positively latched in a position at a right angle to the crank and parallel to the shaft and to be resiliently held in a position parallel to the crank, and adapted to lie in the extension of the recess when in the latter position.

4. In combination, a wall having a circular recess with a radial extension and having an aperture extending therethrough at the center of said recess, an operating shaft extending through said wall, a crank rigidly connected therewith and lying within the recess, a handle pivoted to the end of the crank, a leaf spring attached to the crank and bearing against the handle and adapted to hold it resiliently in a position parallel to the shaft and the handle and spring having co-operating elements adapted to latch the handle positively in a position at a right angle to the crank and parallel to the shaft, the spring having an extension lying in the circular recess and readily accessible to unlatch the elements, and the handle when in its first position lying in the extension and holding the crank from rotation, the said extension of the recess extending beyond the handle to permit of convenient access thereto.

Signed at Rochester, New York, this 11th day of November, 1922.

JULIEN TESSIER.